D. B. BROWNING.
CULTIVATOR ATTACHMENT.
APPLICATION FILED JULY 28, 1908.

914,237.

Patented Mar. 2, 1909.

WITNESSES

INVENTOR
DANIEL B. BROWNING,
BY
ATTORNEYS

UNITED STATES PATENT OFFICE.

DANIEL B. BROWNING, OF MORRISON, OKLAHOMA.

CULTIVATOR ATTACHMENT.

No. 914,237.  Specification of Letters Patent.  Patented March 2, 1909.

Application filed July 28, 1908. Serial No. 445,778.

*To all whom it may concern:*

Be it known that I, DANIEL B. BROWNING, a citizen of the United States, residing at Morrison, in the county of Noble and State of Oklahoma, have invented a new and useful Improvement in Cultivator Attachments, of which the following is a specification.

My invention is an improvement in cultivator attachments, and consists in certain novel constructions and combinations of parts hereinafter described and claimed.

Figure 1:
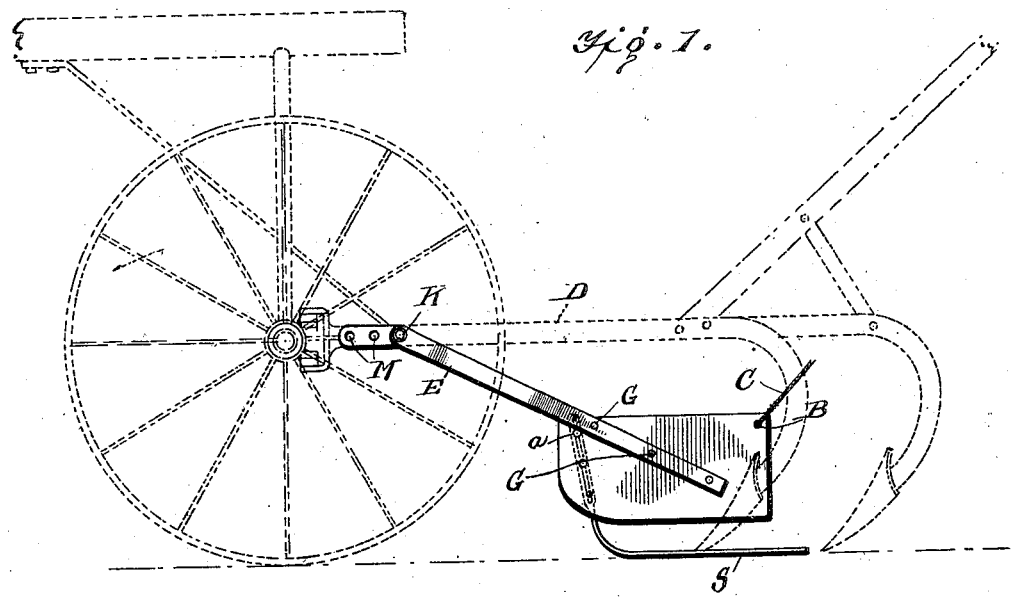
Figure 2:
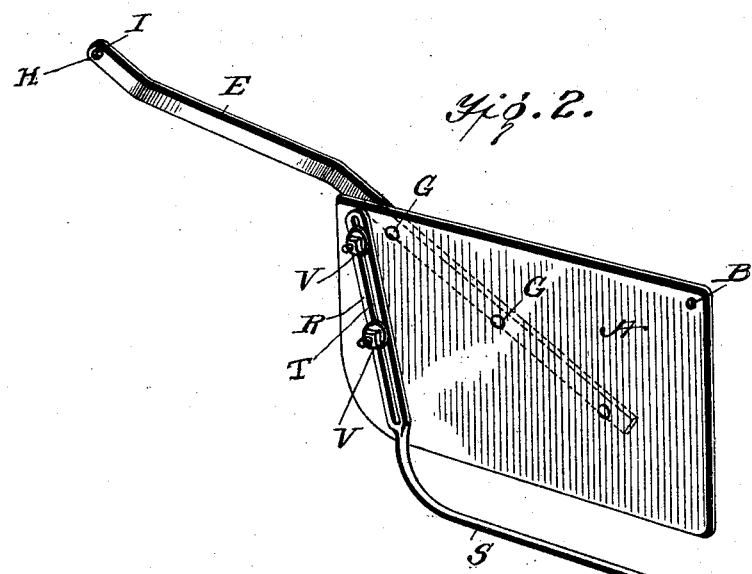

Referring to the drawings forming a part hereof Figure 1 is a side view of the improvement attached to a cultivator, and Fig. 2 is a perspective view of the improvement.

The present embodiment of my invention comprises a fender blade A of usual construction, provided at its rear upper corner with a perforation B in which may engage one end of a chain or cord C, the other end being attached to a suitable portion of the cultivator D.

A hanger arm E is secured to the fender by bolts G, the arm being arranged diagonally of the fender, and is provided at its outer or forward end with an opening H for receiving a pivot bolt I, connected with a lug K secured to the cultivator D by bolts M.

A runner is adjustably secured to each fender blade, the runner comprising a slotted substantially vertical portion R, substantially flat in cross section, and a rounded substantially horizontal portion or runner proper S, extending rearwardly of the fender blade, and adapted to rest upon the ground to support the blade out of contact therewith.

The slot T of the portion R registers with openings in the blade, and the slot and the openings are traversed by bolts U, which are engaged by nuts V to secure the parts in place.

The operation of the improvement is as follows: The fender is supported by the hanger arm, and the runner is adjusted a sufficient distance below the edge of the blade to prevent the earth thrown up by the plows from covering the plants, yet permitting some earth to be thrown toward the plants at the roots thereof. The runners engagement with the ground prevents the fender being removed by the earth thrown up by the plow, as would be the case were it suspended from above alone. The chain acts to take the weight of the blade from the runners, when turning or moving from place to place. The provision of the runner also permits the fender to follow inequalities of the ground, so as to perfectly protect the plants, even when they occupy a lower plane than that traversed by the wheels of the cultivator.

It will be understood that the fender may be attached to the cultivator in any desired manner, the manner shown being chosen merely for convenience.

I claim—

The combination with the cultivator, of a plurality of fenders blades, hanger arms arranged diagonally of the fenders on the outer side of the blade and having a pivotal connection at their free ends with the cultivator, and a runner having a substantially horizontal portion arranged below each blade and extending beyond the rear end of the same, and an angular slotted portion on the opposite side of the fender from the hanger arm, and bolts traversing the slots and the blade for adjustably securing the runner thereto.

DANIEL B. BROWNING.

Witnesses:
EDWARD W. WILLIAMS,
GEORGE F. LONG.